(12) United States Patent
Sasaki et al.

(10) Patent No.: US 9,935,461 B2
(45) Date of Patent: Apr. 3, 2018

(54) CONSUMER APPARATUS OPERATION MANAGEMENT SYSTEM AND METHOD

(71) Applicant: Hitachi, Ltd., Chiyoda-ku, Tokyo (JP)

(72) Inventors: Hiroto Sasaki, Tokyo (JP); Noriyuki Uchiyama, Tokyo (JP); Masao Tsuyuzaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 482 days.

(21) Appl. No.: 14/624,959

(22) Filed: Feb. 18, 2015

(65) Prior Publication Data
US 2015/0255982 A1 Sep. 10, 2015

(30) Foreign Application Priority Data
Mar. 7, 2014 (JP) .................................. 2014-044526

(51) Int. Cl.
*H02J 3/12* (2006.01)
*H02J 3/14* (2006.01)
(Continued)

(52) U.S. Cl.
CPC .............. *H02J 3/12* (2013.01); *G06Q 30/04* (2013.01); *H02J 3/14* (2013.01); *H02J 3/28* (2013.01); *H02J 3/381* (2013.01); *H02J 2003/003* (2013.01); *H02J 2003/007* (2013.01); *Y02B 70/3225* (2013.01); *Y02E 60/76* (2013.01);
(Continued)

(58) Field of Classification Search
None
See application file for complete search history.

(56) References Cited

U.S. PATENT DOCUMENTS 6,624,532 B1 * 9/2003 Davidow ................. H02J 3/14
307/31
8,539,422 B2 * 9/2013 Dai ..................... G06F 17/5045
716/133
(Continued)

FOREIGN PATENT DOCUMENTS

| JP | 2012-95466 A | 5/2012 |
| WO | WO 2012/162570 A1 | 11/2012 |
| WO | WO 2013/164392 A1 | 11/2013 |

OTHER PUBLICATIONS

European Search Report dated Aug. 10, 2015 (Six (6) pages).

*Primary Examiner* — Thomas J Hiltunen
(74) *Attorney, Agent, or Firm* — Crowell & Moring LLP

(57) ABSTRACT

A consumer apparatus operation management system that prepares an operation plan of a consumer control apparatus in a power distribution system includes: an evaluation unit configured to acquire system information including a system topology and impedances in the power distribution system, to predict load amounts and power generation amounts for respective prescribed nodes, to generate a voltage distribution profile indicative of a correlation between a power transmission distance and a voltage transition based on the system information, the load amounts, and the power generation amounts, and to figure out an evaluation value based on a variation width of the voltage distribution profile and a specified voltage width; and a preparation unit configured to prepare an operation plan related to heat quantity control and/or electric-energy control in the consumer control apparatus based on the evaluation value.

10 Claims, 13 Drawing Sheets

(51) Int. Cl.
*H02J 3/28* (2006.01)
*G06Q 30/04* (2012.01)
*H02J 3/38* (2006.01)
*H02J 3/00* (2006.01)

(52) U.S. Cl.
CPC .............. *Y04S 10/54* (2013.01); *Y04S 20/222* (2013.01); *Y04S 40/22* (2013.01); *Y04S 50/12* (2013.01); *Y10T 307/406* (2015.04)

(56) References Cited

U.S. PATENT DOCUMENTS

| | | | |
|---|---|---|---|
| 9,231,463 B2 * | 1/2016 | Oaklander | H03K 17/063 |
| 9,256,232 B2 * | 2/2016 | Bryson | G06F 1/26 |
| 9,619,848 B2 * | 4/2017 | de Castro | G06Q 50/06 |
| 2010/0235008 A1 * | 9/2010 | Forbes, Jr. | G06Q 10/00 |
| | | | 700/291 |
| 2012/0104850 A1 * | 5/2012 | Fallis | H02J 13/0075 |
| | | | 307/31 |
| 2012/0232706 A1 | 9/2012 | Hayashida | |
| 2012/0265586 A1 * | 10/2012 | Mammone | G06Q 50/06 |
| | | | 705/14.1 |
| 2015/0236508 A1 * | 8/2015 | Divan | G05B 15/02 |
| | | | 700/295 |
| 2015/0323423 A1 * | 11/2015 | Alsaleem | G01K 17/08 |
| | | | 62/127 |
| 2016/0096437 A1 * | 4/2016 | Tripathi | H02J 3/381 |
| | | | 307/31 |
| 2016/0141879 A1 * | 5/2016 | Motsenbocker | G05F 1/67 |
| | | | 307/18 |
| 2016/0233682 A1 * | 8/2016 | Do Rosario | H02J 3/387 |

* cited by examiner

CONSUMER APPARATUS OPERATION MANAGEMENT SYSTEM AND METHOD

BACKGROUND OF THE INVENTION

The present invention relates to consumer apparatus operation management systems and methods for adjusting the demand and supply of electric power of consumer apparatus so as not to depart from a specified voltage of a power distribution system.

In the recent technology development of demand side management, services are under consideration in which distributed energy sources to be regulated are integrally managed, rendered to trade the electric power with a system side through, for example, buying and selling surplus electric power and/or adjusting the load amount, and operated as a virtual power generating plant. It is also discussed that the operation of services is performed by a third party other than a power system operator, and a company that performs the operation is called an aggregator. Target distributed energy sources may be originated to the integration of emergency generators and/or compact hydraulic powers in old times, and recently the target apparatus have been expanded to consumer apparatus for reasons of development of the communication technologies. The examples of the target consumer apparatus include a distributed power source to serve as the supply source of electric power, a heat pump and/or an air-conditioner to serve as a load, and further an electric vehicle, a rechargeable battery, and the like that may serve as both the supply source and the load.

JP-A-2012-095466 could be listed, for example, as a background of the field of the present technology. It describes an apparatus which continues to sell the power generated by distributed power supplies while suppressing a voltage rise in a power distribution line caused by the distributed power supplies, the apparatus including a unit which stores an allowable upper voltage limit value that is the upper limit of the allowable range of the voltage in the distribution line, a unit which acquires, from voltmeters installed at various sites of the distribution line, voltage values measured at the respective sites, and a unit which instructs a water heater linked up with the distribution line to heat water when at least one of the acquired voltage values is higher than the allowable upper voltage limit value.

SUMMARY OF THE INVENTION

However, in the conventional technique and the above-described JPA-2012-095466, when a consumer apparatus is controlled to the extent more than necessary to contain the voltage values at various sites in a feeder within the upper/lower-limit values of an allowable range of the voltage, the voltage might depart from the voltage constraint values at any one of the sites in the feeder as a result of controlling the consumer apparatus at a prescribed site because variations in the voltage distribution at the respective sites in the feeder are not taken into consideration. Moreover, because this voltage distribution is not taken into consideration, the optimum control of the consumer apparatus in the range not departing from the voltages cannot be performed.

In order to solve the above-described problems, according to an aspect of the present invention, there is provided a consumer apparatus operation management system that prepares an operation plan of consumer control apparatus in a power distribution system, the consumer apparatus operation management system including: an evaluation unit configured to acquire system information including a system topology and impedances in the power distribution system, to predict load amounts and power generation amounts for respective prescribed nodes, to generate a voltage distribution profile indicative of a correlation between a power transmission distance and a voltage transition based on the system information, the load amounts, and the power generation amounts, and to figure out an evaluation value based on a variation width of the voltage distribution profile and a specified voltage width; and a preparation unit configured to prepare an operation plan related to heat quantity control and/or electric-energy control in the consumer control apparatus based on the evaluation value.

Moreover, an invention of a method corresponding to the above-described system is also included.

According to the present invention, the possibility of the deviation from voltage constraint values in a feeder that may occur while controlling a prescribed consumer apparatus can be reduced and the control amount of the consumer apparatus can be optimized.

Other objects, features, and advantages of the invention will become apparent from the following description of the embodiments of the invention taken in conjunction with the accompanying drawings.

DESCRIPTION OF THE EMBODIMENTS

Hereinafter, embodiments of a consumer apparatus control method and a control system to which the present invention is applied are described along with the accompanying drawings.

Figure 1:
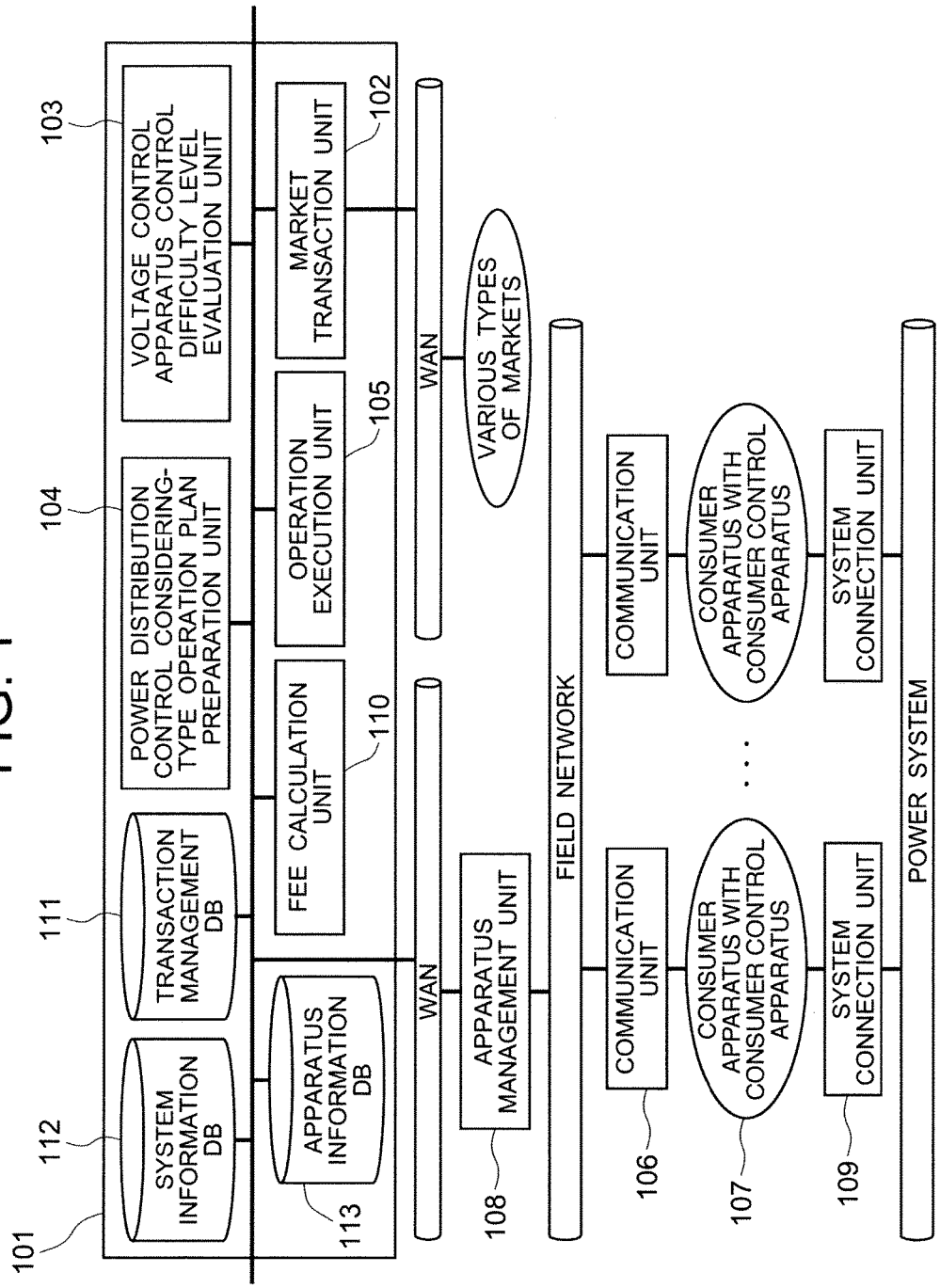
FIG. 1 illustrates an example of an overall system configuration including a configuration of a consumer apparatus operation management system.

FIG. 1 illustrates a configuration example of an overall system including a configuration diagram of a consumer apparatus operation management system 101. A market transaction unit 102 conducts transactions with various types of markets such as an ancillary market, a capacity market, and a spot market, and determines a control amount (hereinafter, referred to as a DR adjustment amount) of demand response (hereinafter, referred to as DR) and an incentive therefor (hereinafter, referred to as a DR incentive). An aggregator needs to prepare an operation plan of consumer apparatus to be managed, so as to satisfy the DR adjustment amount. In preparing the operation plan, first, a voltage control apparatus control difficulty level evaluation unit 103 indexes a difficulty level (hereinafter, referred to as a voltage control apparatus control difficulty level) for a power distribution company to control a voltage control apparatus such as a load ratio control transformer (hereinafter, referred to as an LRT), a static var compensator (hereinafter, referred to as an SVC), and a step voltage regulator (hereinafter, referred to as an SVR) thereby adjusting the distribution voltage to within an appropriate range. A power distribution control considering-type operation plan preparation unit 104 prepares an operation plan so as to maintain or reduce the indexed voltage control apparatus control difficulty level. An operation execution unit 105 outputs to an apparatus management unit 108 a control command for consumer apparatus, in accordance with the operation plan. The apparatus management unit 108 controls each consumer apparatus 107 via a communication unit 106 by rewriting an apparatus operation schedule set in each consumer apparatus 107 or by outputting a control command directly to each consumer apparatus 107 in accordance with the control command. A system connection unit 109 connects a consumer apparatus 107 and a power system using a power converter for interconnection such as, for example, a PCS, and transmits measured electric energy to the apparatus management unit 108 via the communication unit 106. Based on the electric energy and the like, the apparatus management unit 108 notifies a fee calculation unit 110 of the control results in DR such as the control amounts of respective consumer apparatus 107 (hereinafter, referred to as the apparatus control amounts). Based on this notified control result, the fee calculation unit 110 figures out the contributions of respective consumer apparatus 107, and calculates the incentives for practice that are paid to respective consumers from among the DR incentive. The information needed for these are retained by various types of databases (hereinafter, referred to as DBs). A transaction management DB 111 retains consumer transaction information such as the incentive for practice and a contract term, and market transaction information such as the DR adjustment amount and the DR incentive. A system information DB 112 retains system information which includes an appropriate voltage range of a feeder connected to a substation, the system topology such as nodes of the feeder and links to connect them, and impedances of distribution lines used in the links. An apparatus information DB 113 retains the consumer apparatus information, including connection nodes of the feeders to which respective consumer apparatus 107 connect, apparatus conditions such as heat storage amounts and states of charge (hereinafter, referred to as SOCs) of respective consumer apparatus 107, apparatus operation schedules of respective consumer apparatus 107, and change histories of the apparatus operation schedules. An aggregator may manage all of these constituents of the consumer apparatus operation management systems 101, or a power system operator such as a power distribution company may manage all or part of them. Incidentally, as hardware configuration, processing devices configured to process using a processor or the like and storage devices configured to store data using a memory or storage may be conceivable for various units described above and DBs, respectively. Incidentally, control of consumer apparatus described above may be performed via consumer control apparatus provided to consumer apparatus.

Figure 2:
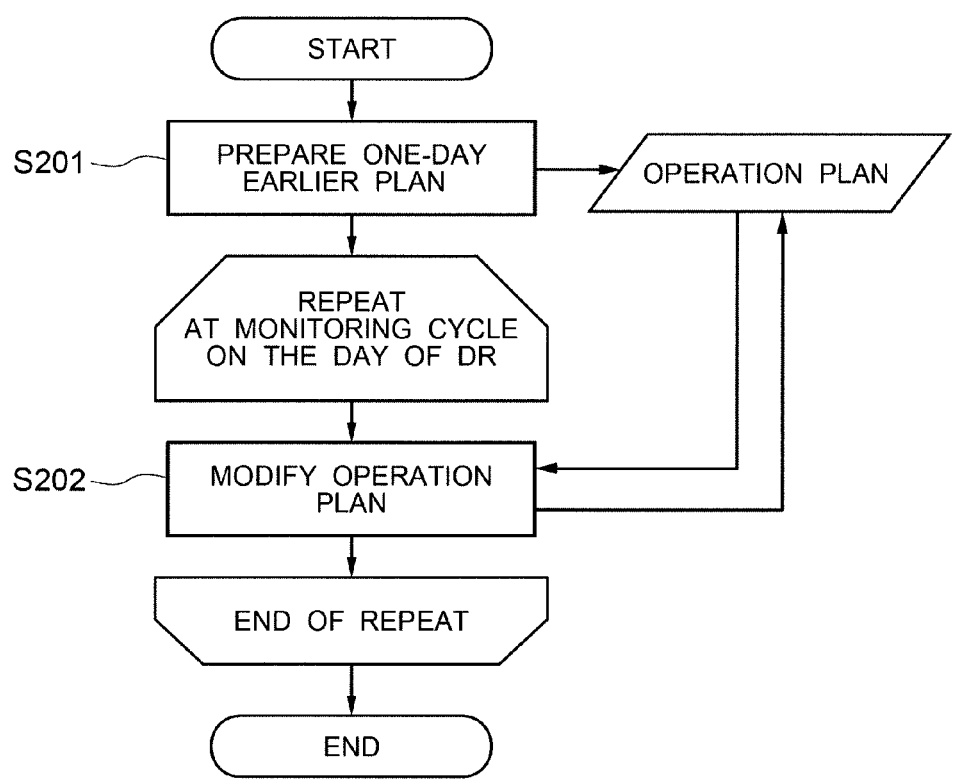
FIG. 2 illustrates an example of an operation plan preparation flow in a power distribution control considering-type operation plan preparation unit.

FIG. 2 illustrates an example of an operation plan preparation flow in the power distribution control considering-type operation plan preparation unit 104. In Step S201, the power distribution control considering-type operation plan preparation unit 104 prepares at a prescribed time such as 18:00, for example, on the day before a DR an operation plan as a one-day earlier plan. On the day of a DR, the power distribution control considering-type operation plan preparation unit 104 repeats modification of the operation plan of Step S201 at a monitoring cycle such as a 30 minute cycle, for example, (S202).

Figure 3:
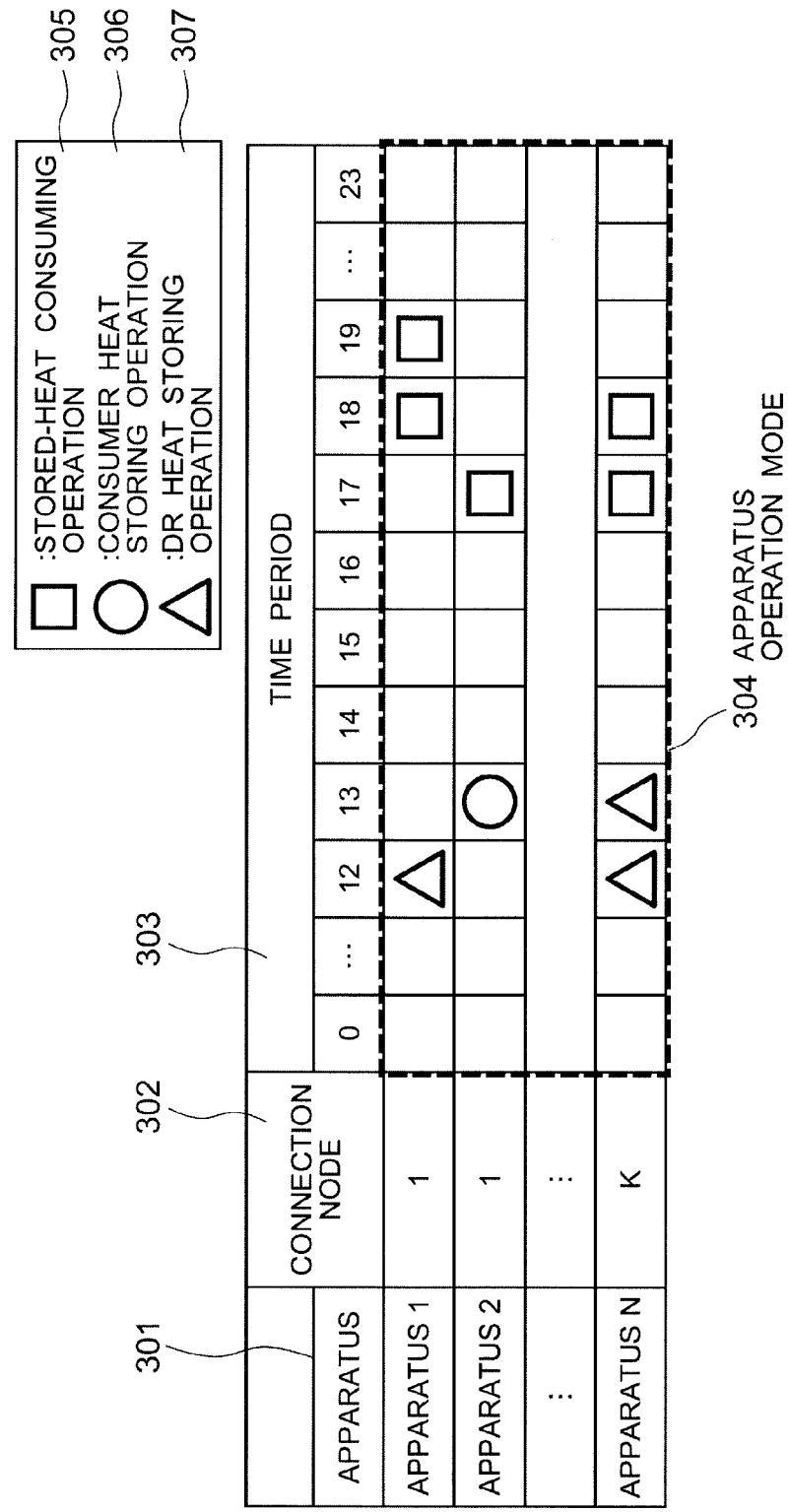
FIG. 3 illustrates an example of the operation plan prepared by the power distribution control considering-type operation plan preparation unit.

FIG. 3 illustrates an example of the operation plan. The operation plan includes a consumer apparatus list 301, connection nodes 302 of respective consumer apparatus, and apparatus operation modes 304 of respective consumer apparatus in each time period 303 of respective control cycles. The apparatus operation modes 304 include, if it is an apparatus for storing heat such as a heat pump, a stored-heat consuming operation 305 in which stored heat is consumed with showers or the like, a consumer heat storing operation 306 in which a heat storing operation is performed in accordance with an apparatus operation schedule set by a consumer, and a DR heat storing operation 307 in which a heat storing operation is performed while being controlled with DR. In the case of an apparatus for storing electricity such as a rechargeable battery, the consumption of stored heat and the heat storing may be rephrased as discharging and charging, respectively. The same is true hereinafter.

Figure 4:
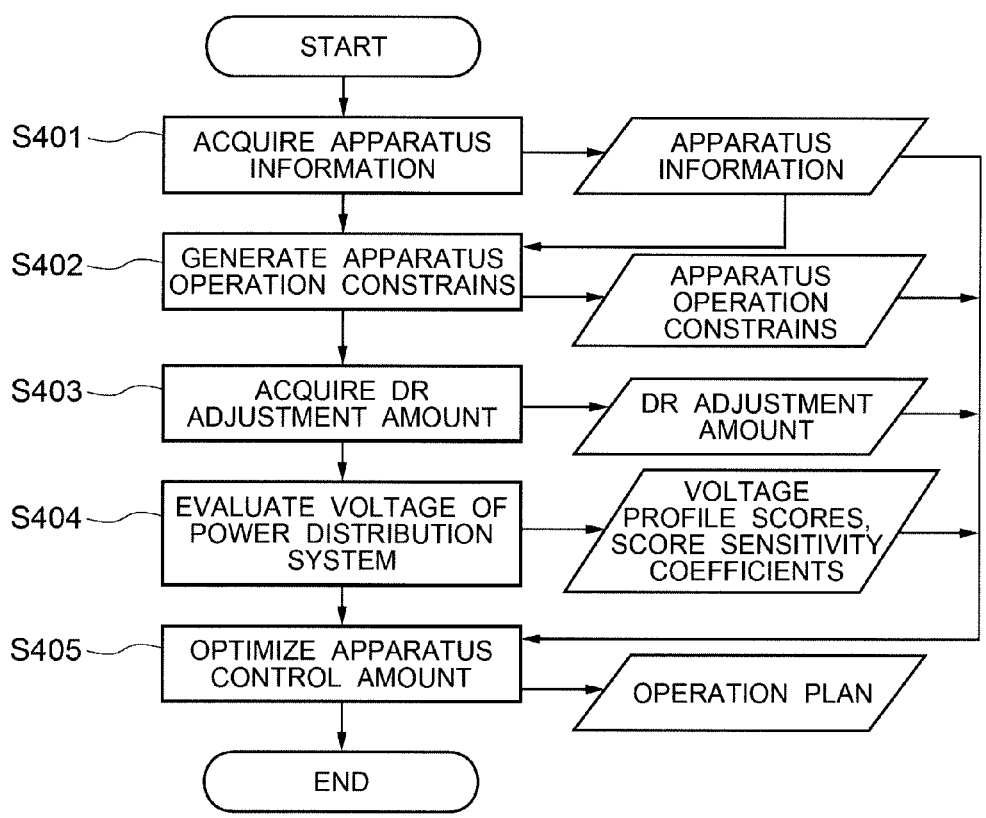
FIG. 4 illustrates an example of a preparation flow of a one-day earlier plan in the power distribution control considering-type operation plan preparation unit.

FIG. 4 illustrates an example of a flow in which the power distribution control considering-type operation plan preparation unit 104 prepares a one-day earlier plan in Step S401. In step S401 the power distribution control considering-type operation plan preparation unit 104 acquires apparatus information from the apparatus information DB 113. The power distribution control considering-type operation plan preparation unit 104 generates in Step S402 apparatus operation constraints using the apparatus operation schedule that is a part of the apparatus information. The apparatus operation constraints are formed of heat storing time slots of respective apparatus and heat storing time periods required in the heat storing time slots. The power distribution control considering-type operation plan preparation unit 104 acquires a DR adjustment amount from the transaction management DB 111 in Step S403. The DR adjustment amount contains a time period during which a DR is performed and a target value of the total amount of apparatus control in the time period. Moreover, in Step S404, the power distribution control considering-type operation plan preparation unit 104 requests the voltage control apparatus control difficulty level evaluation unit 103 to evaluate the voltage of the power distribution system, and acquires as a result of the evaluation a voltage profile score, which is an indexed voltage control apparatus control difficulty level, for each time period 303 and score sensitivity coefficients, which indicate variations in the score with respect to variations in a unit load for respective nodes. With the connection nodes and the apparatus operation schedules of the apparatus that are part of the apparatus information acquired in Step S401, the apparatus operation constraints generated in Step S402, the DR adjustment amount acquired in Step S403, and the voltage profile score and the score sensitivity coefficients acquired in Step S404, the power distribution control considering-type operation plan preparation unit 104 optimizes the apparatus control amount and prepares an operation plan in Step S405.

Figure 5:
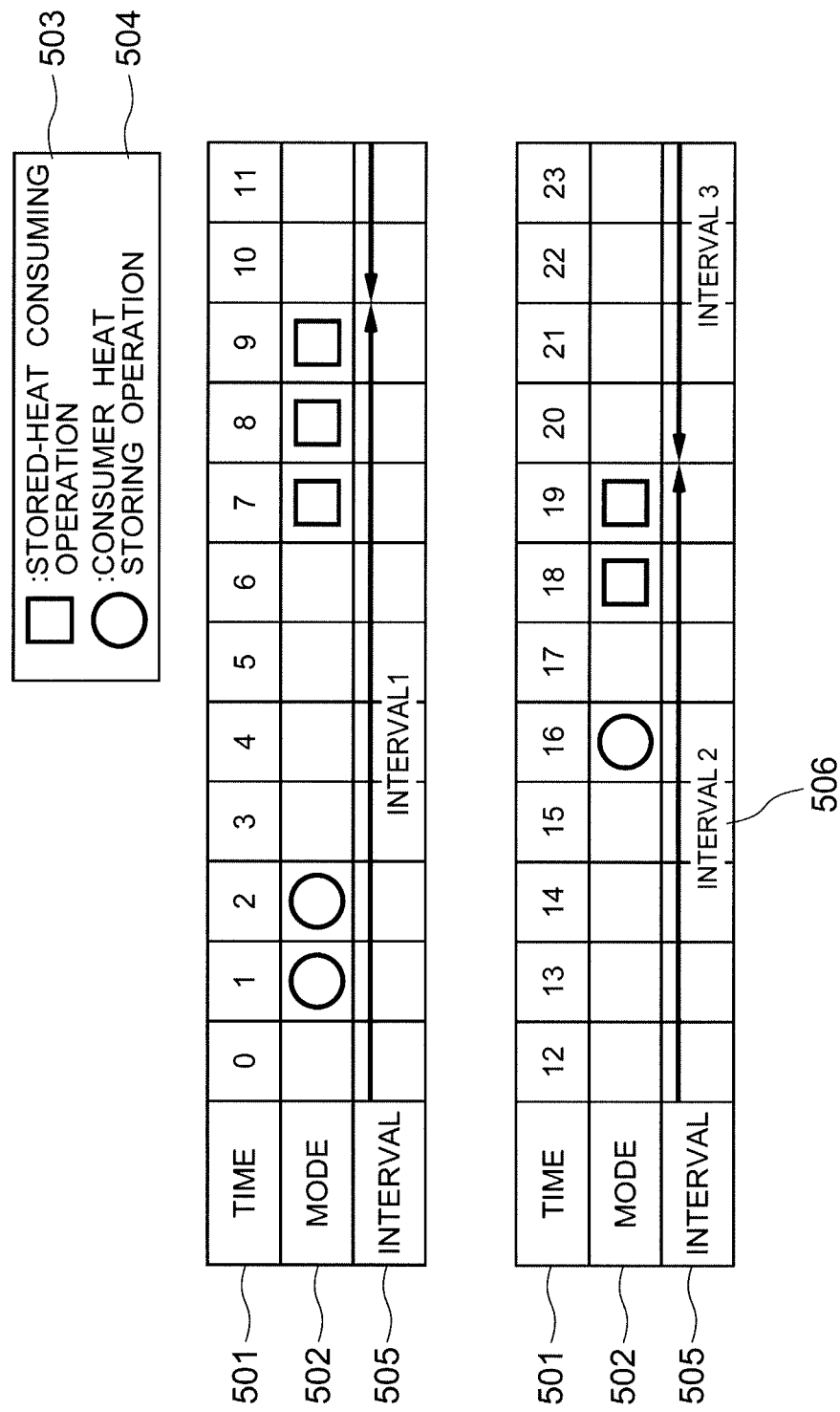
FIG. 5 illustrates an example of an apparatus operation schedule.

FIG. 5 illustrates an example of the apparatus operation schedule which the power distribution control considering-type operation plan preparation unit 104 uses in Step S402. For a certain consumer apparatus, there are respective time periods 501 for respective control cycles, operation modes 502 in respective time periods set by a consumer, and intervals 505 indicative of one cycle of schedule units. The stored-heat consuming operations 503 and consumer heat storing operations 504 are set in the operation modes 502. The intervals 505 refer to time slots from an end point of a stored-heat consuming operation 503 to an end point of the next stored-heat consuming operation 503. Within this interval, a consumer apparatus needs to perform a heat storing operation before the stored-heat consuming operation 503 starts and, therefore, the power distribution control considering-type operation plan preparation unit 104 generates in Step S402, from the apparatus operation schedule, a heat storing time slot for respective intervals of each apparatus and a heat storing time period required in the heat storing time slot as the apparatus operation constraints. In the example of FIG. 5, the apparatus operation constraints related to Interval 2 (506) are the heat storing time slot of from 10:00 till 19:00 and the heat storing time of one hour.

Figure 6:
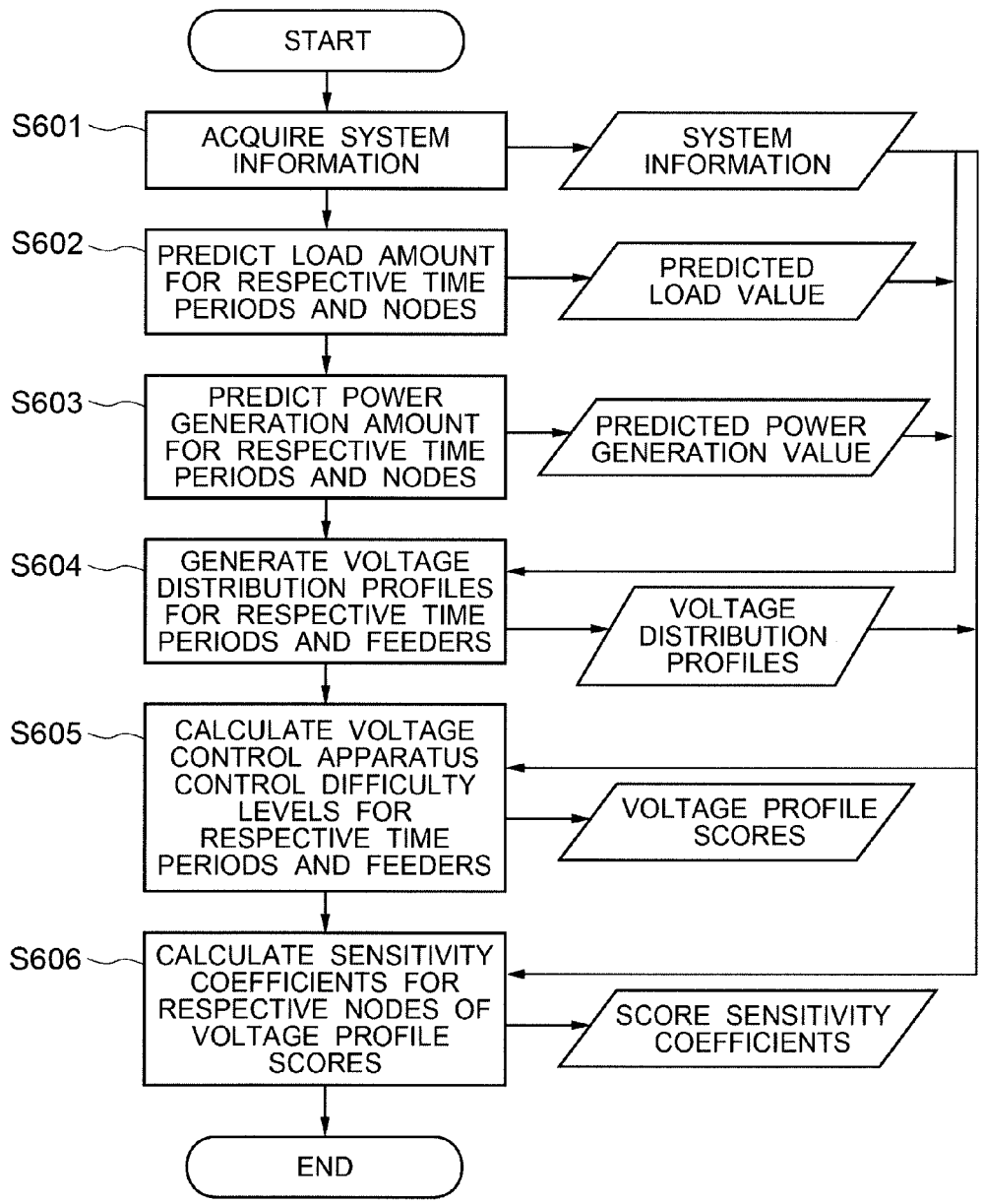
FIG. 6 illustrates an example of a voltage evaluation flow in a voltage control apparatus control difficulty level evaluation unit.

FIG. 6 illustrates an example of the voltage evaluation flow which the voltage control apparatus control difficulty level evaluation unit 103 performs in Step S404. The voltage control apparatus control difficulty level evaluation unit 103 acquires system information from the system information DB 112 in Step S601. Also, in Step S602, load amounts are predicted for respective time periods and nodes using the weather forecast for temperature, humidity, and the like on the next day, information on the type of the day such as a holiday and a weekday, and the like. Furthermore, in Step S603, power generation amounts are predicted for respective time periods and nodes from the weather information such as the wind speed and the amount of insolation on the next day, and the like. Using the system topology of links and nodes and the impedances of the distribution lines constituting the links acquired as the system information in Step S601, the load amounts for respective time periods and nodes predicted in Step S602, and the amounts of power generated for respective time periods and nodes predicted in Step S603, the voltage control apparatus control difficulty level evaluation unit 103 generates voltage distribution profiles for respective feeders and time periods in Step S604. Using the voltage distribution profiles for respective feeders and time periods and the appropriate voltage ranges for respective feeders acquired as the system information in Step S601, the voltage control apparatus control difficulty level evaluation unit 103 calculates voltage profile scores for respective feeders and time periods as indicators of the voltage control apparatus control difficulty levels in Step S605. Moreover, using the system topology of links and nodes and the impedances of the distribution lines constituting the links, which are acquired as the system information in Step S601, and the voltage distribution profiles generated for respective feeders and time periods in Step S604, the voltage control apparatus control difficulty level evaluation unit 103 calculates variations in the scores with respect to variations in a unit load for respective nodes as the score sensitivity coefficients for respective time periods and nodes. The voltage control apparatus control difficulty level evaluation unit 103 outputs the voltage profile scores and the score sensitivity coefficients to the power distribution control considering-type operation plan preparation unit 104.

Figure 7:
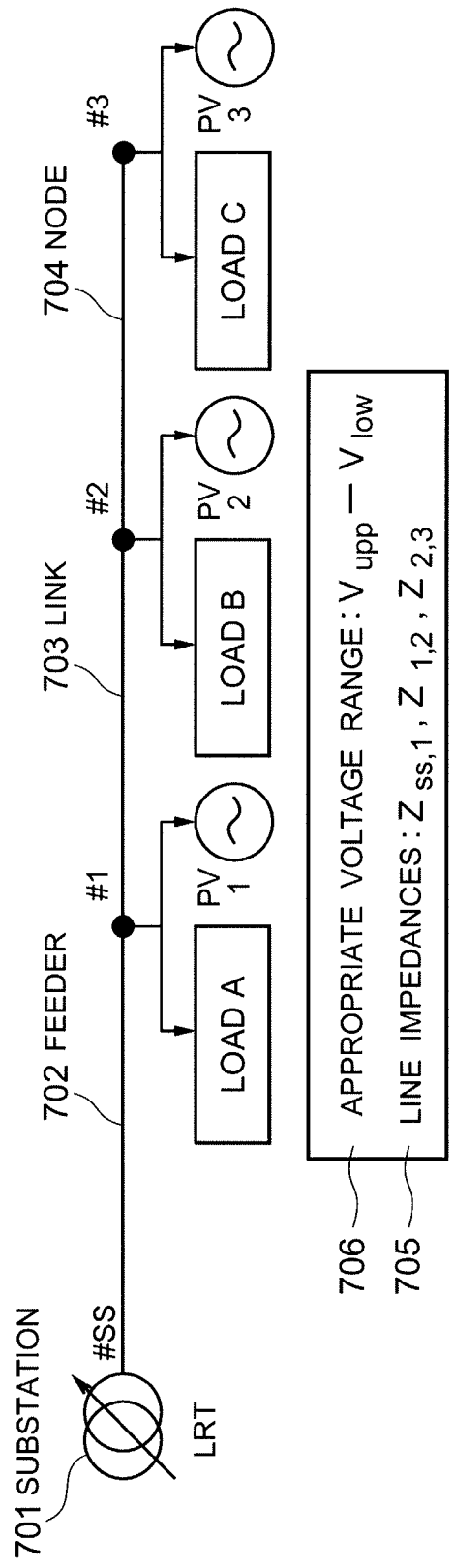
FIG. 7 illustrates an example of system information.

FIG. 7 illustrates an example of the system information which the voltage control apparatus control difficulty level evaluation unit 103 acquires in Step S601. The system information includes a system topology of a feeder 702 connected to a substation 701, and links 703 and nodes 704 constituting the feeder 702, line impedances 705 of the distribution lines constituting the links 703, and an appropriate voltage range 706 that is the appropriate range of the voltage value in the feeder 702.

Figure 8:
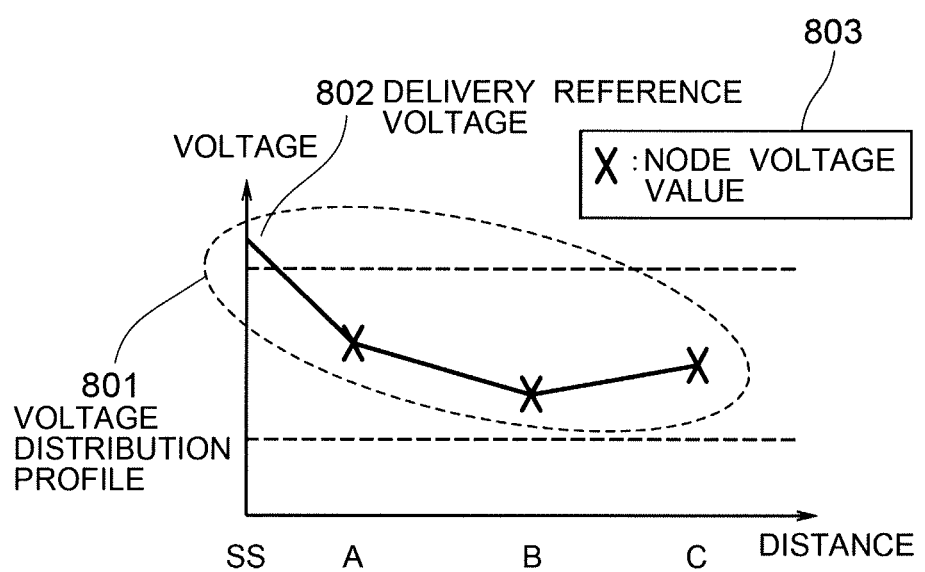
FIG. 8 illustrates an example of a voltage distribution profile.

FIG. 8 illustrates an example of the voltage distribution profile which the voltage control apparatus control difficulty level evaluation unit 103 generates in Step S604. A voltage distribution profile 801 includes a delivery reference voltage 802 from the substation 701 and node voltage values 803 of respective nodes on the feeder. The voltage distribution profile 801 is generated by the voltage control apparatus control difficulty level evaluation unit 103 by calculating voltage drops or performing power flow calculation, in accordance with the system topology acquired as the system information in Step S601, from the impedances of respective links, and the load amounts and the power generation amounts for respective nodes. With this configuration, a voltage distribution before the voltage control apparatus controls can be generated.

Figure 9A:
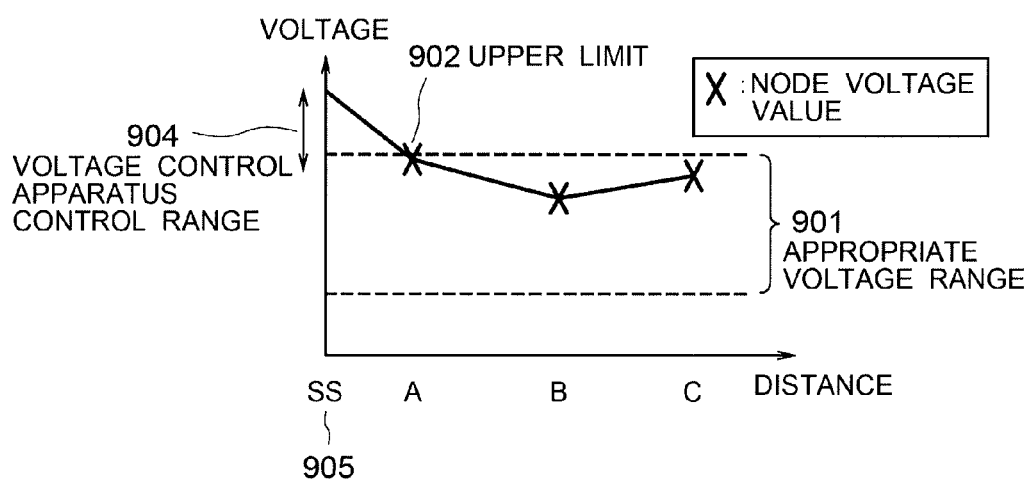
FIGS. 9A and 9B show diagrams for explaining a control difficulty level of a voltage control apparatus.
Figure 9B:
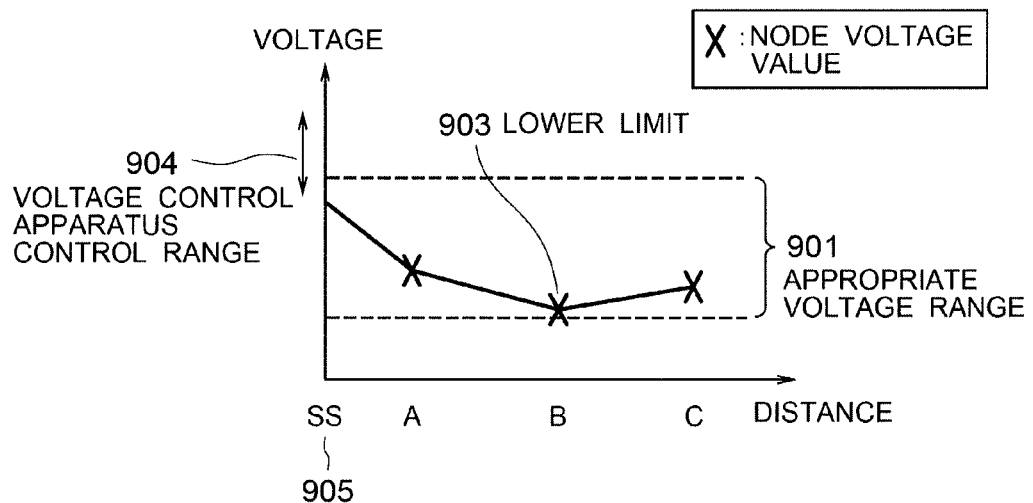

FIGS. 9A and 9B show diagrams to explain the control difficulty level of a voltage control apparatus which the voltage control apparatus control difficulty level evaluation unit 103 evaluates in Step S605. For example, considering a case where the voltage values of the nodes on the feeder are adjusted within an appropriate voltage range 901 by controlling the delivery voltage 802 at the substation 705 using an LRT, a control range (904) of the voltage control apparatus with which the voltage values of all the nodes can be adjusted within the appropriate voltage range 901 is from a control amount causing the voltage value of at least one node on the feeder to reach the upper limit (902) of the appropriate voltage range to a control amount causing the voltage value of at least one node on the feeder to reach the lower limit (903) of the appropriate voltage range. If the width of the control range 904 is small, it is difficult to control the voltage control apparatus for an appropriate control amount and, to the contrary, if it is large, it is easy to control the voltage control apparatus for an appropriate control amount.

Figure 10A:
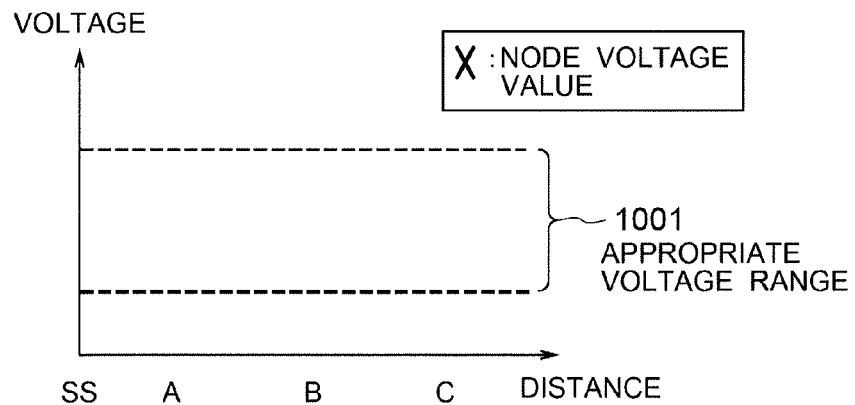
FIGS. 10A, 10B, and 10C show diagrams for explaining a voltage profile score.
Figure 10B:
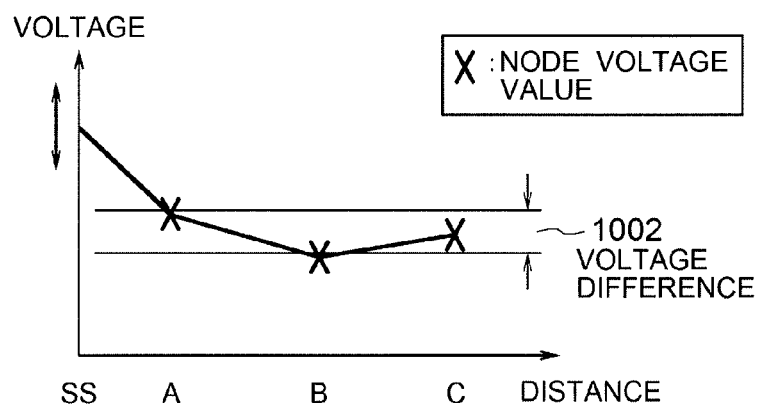
Figure 10C:
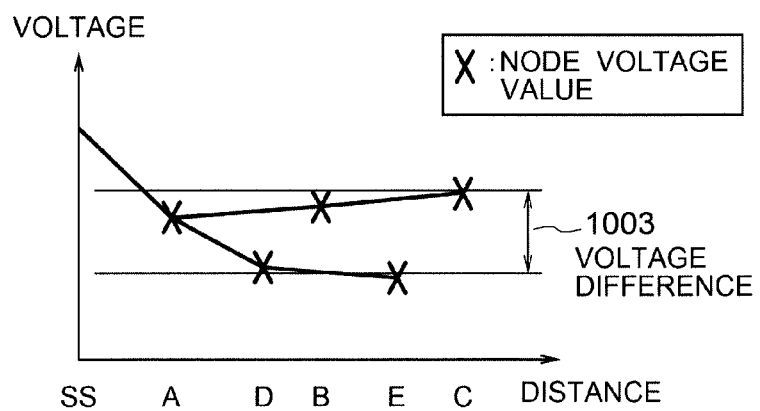

FIGS. 10A, 10B, and 10C show diagrams for explaining the voltage profile score which serves as an indicator of the voltage control apparatus control difficulty level. The voltage profile score is calculated as a ratio of a voltage difference 1002 in a feeder to an appropriate voltage range 1001. Specifically, it is calculated by performing a division with a subtraction of the lower limit value from the upper limit value of the appropriate voltage range to be the denominator and a subtraction of the smallest value from the largest value of the node voltage values in the feeder to be the numerator, respectively. Thus, if the voltage profile score is high, the appropriate control range (904) of the voltage control apparatus becomes small and, therefore, control of the voltage control apparatus is difficult. To the contrary, if the voltage profile score is low, the appropriate control range (904) of the voltage control apparatus becomes large and, therefore, control of the voltage control apparatus is easy. With this configuration, the control difficulty level of a voltage control apparatus can be evaluated.

Figure 11A:
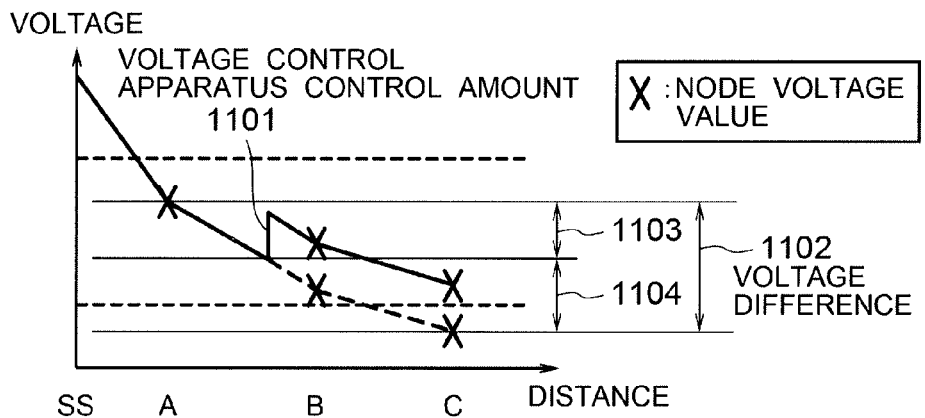
FIGS. 11A, 11B, and 11C exemplify effects of the present invention on an SVC and an SVR.
Figure 11B:
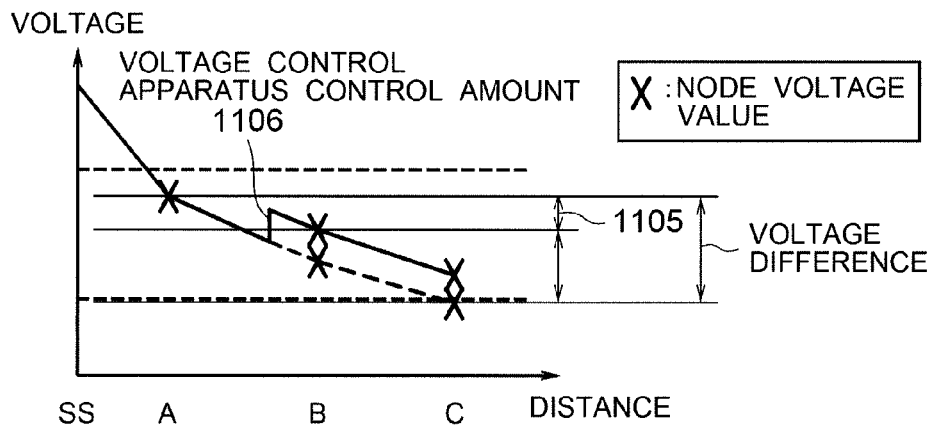
Figure 11C:
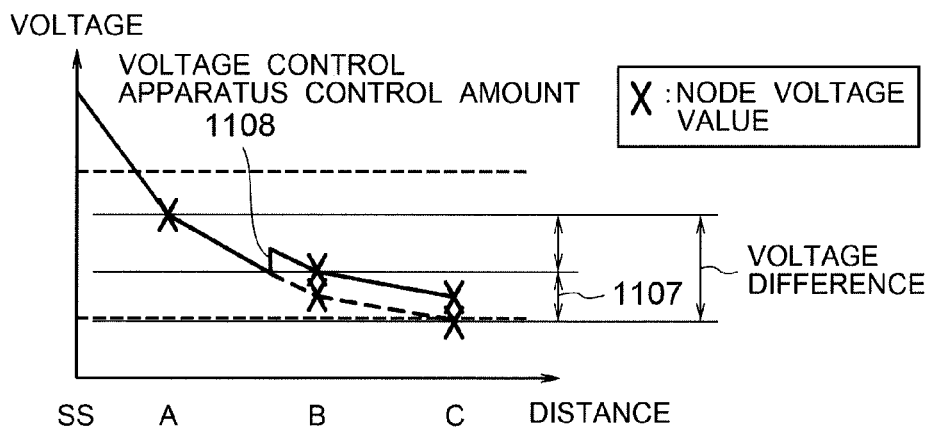

FIGS. 11A, 11B, and 11C exemplify effects of the present invention on a voltage control apparatus such as an SVC and an SVR that performs voltage control in the middle of a feeder. Consider a case where a control amount 1101 of a voltage control apparatus is needed in order to contain node voltage values within an appropriate range in a voltage distribution profile before the voltage control apparatus controls. In this case, reduction of the voltage profile score would mean reduction of both or either one of a voltage difference 1103 and a voltage difference 1104 to reduce a total voltage difference 1102. When the voltage difference 1103 is reduced to a voltage difference 1105 according to the present invention, with regard to the control amount of the voltage control apparatus, because the voltage on the primary side increases, the voltage control amount for raising the voltage to the same voltage value as that prior to application of the present invention is only a control amount 1106. Since this is smaller than the control amount 1101, it is conceived that the control by the voltage control apparatus becomes easier. Similarly, when the voltage difference 1104 is reduced to a voltage difference 1107 according to the present invention, with regard to the control amount of the voltage control apparatus, because the voltage drop on the secondary side decreases, the voltage does not need to be raised to the same voltage value as that prior to application of the present invention and the voltage control amount is only a control amount 1108. Since this is also smaller than the control amount 1101, it is conceived that the control by the voltage control apparatus becomes easier. From the aforementioned, evaluation of the control difficulty level of a voltage control apparatus by means of the voltage profile score is effective not only in the control apparatus of the delivery voltage of a substation such as an LRT but in a voltage control apparatus such as an SVC or an SVR, which performs voltage control in the middle of a feeder.

Figure 12:
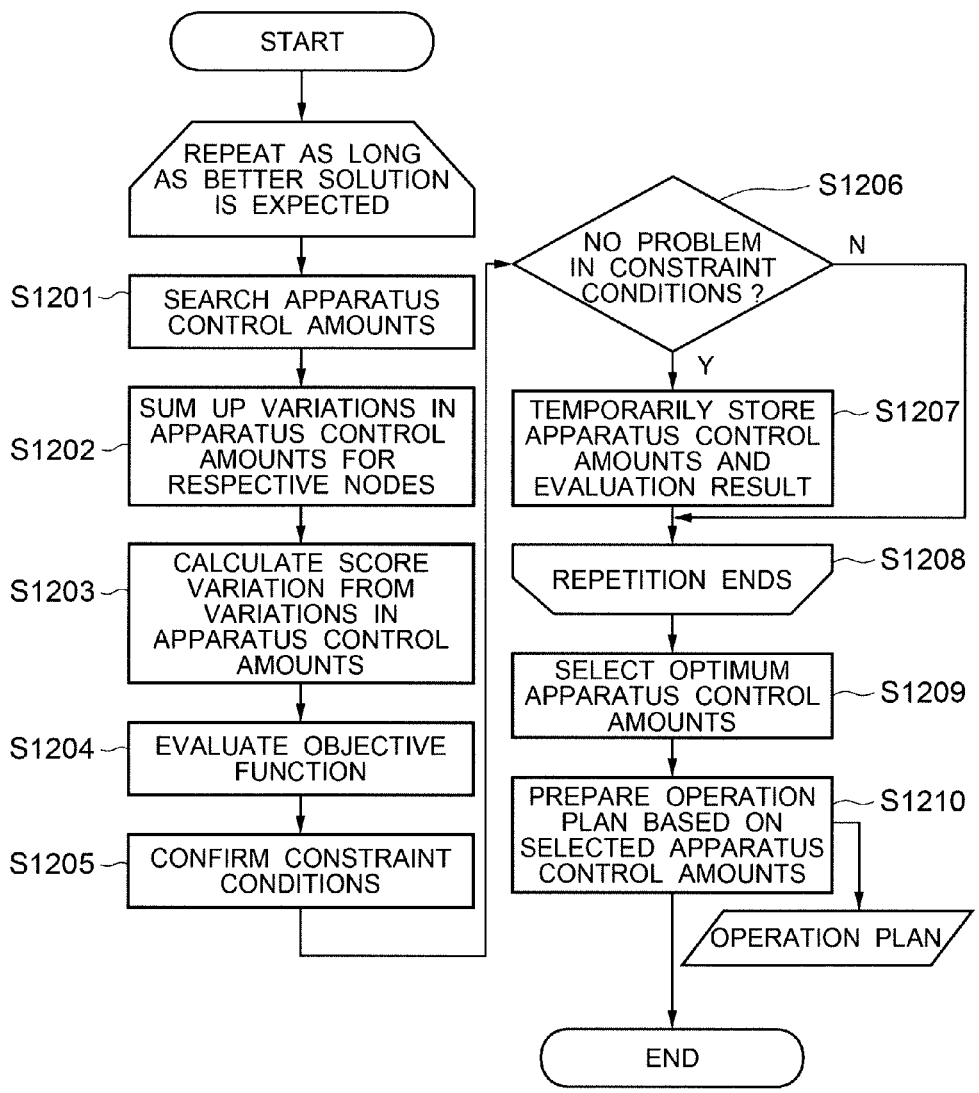
FIG. 12 illustrates an example of a flow for optimizing an apparatus control amount in the power distribution control considering-type operation plan preparation unit.

FIG. 12 illustrates an example of the flow when the power distribution control considering-type operation plan preparation unit 104 optimizes the apparatus control amount in Step S405. In Step S405, the power distribution control considering-type operation plan preparation unit 104 searches the apparatus control amounts of the consumer apparatus from the apparatus operation schedules acquired as the apparatus information in Step S401 in accordance with the apparatus operation constraints prepared in Step S402, so that the sum of the apparatus control amounts satisfies the DR adjustment amount acquired in Step S403. In the example of the apparatus operation schedule of FIG. 5, the search is performed by changing some or all of the consumer heat storing operations 504 to the DR heat storing operations. The power distribution control considering-type operation plan preparation unit 104 sums up the variations in the apparatus control amounts for respective connection nodes in Step S1202 using the connection nodes of the apparatus acquired as the apparatus information in Step S1201. Next, a score variation in the voltage profile score is calculated in Step S1203 using the variations in the apparatus control amounts for the respective nodes and the score sensitivity coefficients acquired in Step S606. Specifically, it is calculated by multiplying the variations of the apparatus control amounts for the respective nodes by the score sensitivity coefficients. The power distribution control considering-type operation plan preparation unit 104 evaluates an objective function of the DR using the searched apparatus control amounts in Step S1204, and confirms the constraint conditions on the DR in Step S1205. The voltage profile score evaluated by the power distribution control considering-type operation plan preparation unit 104 in Step S605 and the score variation in the voltage profile score may be directly used in combination for the objective function, or may be used as constraint conditions. For example, when a voltage distribution profile that makes the control of the voltage control apparatus most difficult within one day is desired to be improved to the maximum extent, the maximum value within one day of the value acquired by adding the score variation to the voltage profile score may be taken as the objective function and it may be minimized. Otherwise, in order for the voltage control difficulty level of the voltage distribution profile to be equal to or less than a reference value in all the time periods, the constraint conditions may be set so that the value acquired by adding the score variation to the voltage profile score always becomes equal to or less than the reference value. Here, the value acquired by adding the score variation to the voltage profile score means the voltage profile score after DR control. The objective function and the constraint conditions may be set in other manners than these and use of the voltage profile score and the score variation for at least one of the objective functions or the constraint conditions allows the control difficulty level of the voltage control apparatus after controlling consumer apparatus to be taken into consideration. If there is no problem in the constraint conditions in Step S1205 (S1206), in Step S1207 the power distribution control considering-type operation plan preparation unit 104 temporarily stores the apparatus control amounts and the evaluation result of the objective function in Step S1204. As long as the evaluation result of the objective function in Step S1204 is expected to be improved by further performing in Step S1201 a search for the apparatus control amounts of the consumer apparatus, in Step S1208 the power distribution control considering-type operation plan preparation unit 104 repetitively performs Step S1201 to Step S1207. As for the repetitive operation in S1208 from Step S1201 to Step S1207, a general optimization technique may be used and, for example, a meta-heuristic approach such as mixed integer programming and particle swarm optimization can be contemplated; usually the number of times of repetition sufficient for optimization is specified. In Step S1209, the power distribution control considering-type operation plan preparation unit 104 selects, among a plurality of sets of the apparatus control amounts temporarily stored in Step S1207, the optimum apparatus control amounts which provide the best evaluation result of the objective function in Step S1204. The power distribution control considering-type operation plan preparation unit 104 prepares an operation plan based on the optimum apparatus control amounts in Step S1210.

Figure 13:
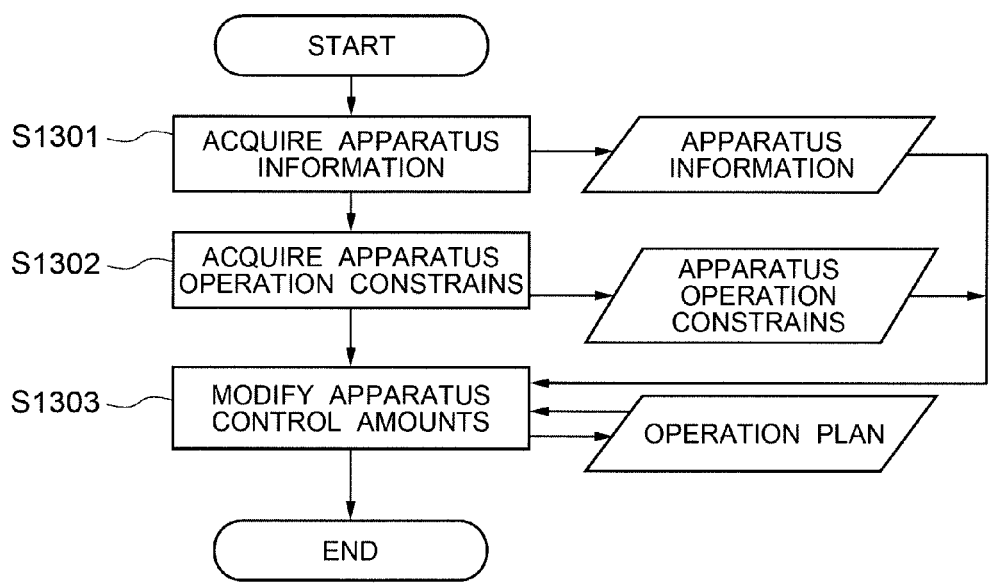
FIG. 13 illustrates an example of a flow for modifying an operation plan in the power distribution control considering-type operation plan preparation unit.

FIG. 13 illustrates an example of the flow when the power distribution control considering-type operation plan preparation unit 104 modifies the operation plan in Step S202. The power distribution control considering-type operation plan preparation unit 104 acquires apparatus information from the apparatus information DB 113 in Step S1301. Next, in Step S1302, the power distribution control considering-type operation plan preparation unit 104 acquires the apparatus operation constraints generated in Step S402. Finally, in Step S1303, the power distribution control considering-type operation plan preparation unit 104 modifies the apparatus control amounts and updates the operation plan. More specifically, it is modified as the change history of the apparatus operation schedules by a consumer, which is acquired as the apparatus information in Step S401, and the apparatus conditions such as the heat storage amount and the SOC are monitored and a schedule of the DR heat storing operation is switched over from an apparatus whose DR heat storing operation is scheduled but is difficult to be performed to another apparatus whose DR heat storing operation is not scheduled but practicable. At this time, using the connection nodes of the apparatus acquired as the apparatus information in Step S401, the schedule of the DR heat storing operation is switched over to an apparatus connected to the same node as much as possible. With this configuration, an operation plan can be modified while suppressing the change of the control difficulty level of a scheduled voltage control apparatus.

By employing the above-described configuration, control of the distribution voltage by a voltage control apparatus can be simplified and the voltage constraint violations occurring in controlling consumer apparatus decrease. Thus, control amounts of consumer apparatus practicable with an existing capability of a power distribution equipment increases and tradable control amounts of consumer apparatus can be increased.

It should be noted that the present invention is not limited to the above-described embodiments but various modifications are included. For example, the above-described embodiments have been described in detail for ease of explanation of the present invention, and are not necessarily limited to the embodiments having all the described configurations.

The invention claimed is:

1. A consumer apparatus operation management system that prepares an operation plan of a consumer control apparatus in a power distribution system, the consumer apparatus operation management system comprising:
    an evaluation unit configured
        to acquire system information including a system topology and impedances in the power distribution system,
        to predict load amounts and power generation amounts for respective prescribed nodes,
        to generate a voltage distribution profile indicative of a correlation between a power transmission distance and a voltage transition based on the system information, the load amounts, and the power generation amounts, where the voltage distribution profile includes a delivery reference voltage from a substation and node voltage values of the respective nodes, and
        to determine an evaluation value based on a variation width of the voltage distribution profile and a specified voltage width; and
    a preparation unit configured to prepare an operation plan related to heat quantity control and/or electric-energy control in the consumer control apparatus based on the evaluation value.

2. The consumer apparatus operation management system according to claim 1, wherein the evaluation unit determines the variation width from a difference between a maximum value and a minimum value of voltages at the nodes in the voltage distribution profile.

3. A consumer apparatus operation management system that prepares an operation plan of a consumer control apparatus in a power distribution system, the consumer apparatus operation management system comprising:
    an evaluation unit configured
        to acquire system information including a system topology and impedances in the power distribution system,
        to predict load amounts and power generation amounts for respective prescribed nodes,
        to generate a voltage distribution profile indicative of a correlation between a power transmission distance and a voltage transition based on the system information, the load amounts, and the power generation amounts, and
        to determine an evaluation value based on a variation width of the voltage distribution profile and a specified voltage width; and
    a preparation unit configured to prepare an operation plan related to heat quantity control and/or electric-energy control in the consumer control apparatus based on the evaluation value, wherein the evaluation value is a value acquired by dividing the variation width by the specified voltage width.

4. The consumer apparatus operation management system according to claim 3, wherein the operation plan is prepared based on the voltage distribution profile when the evaluation value becomes smallest.

5. The consumer apparatus operation management system according to claim 1, wherein the evaluation unit further determines evaluation sensitivities indicative of variations of the evaluation value with respect to unit variations of the load amounts for the respective nodes.

6. The consumer apparatus operation management system according to claim 1, wherein the preparation unit varies control amounts of a voltage control apparatus in the power distribution system and/or the consumer control apparatus at the nodes based on the evaluation value and prepares the operation plan.

7. The consumer apparatus operation management system according to claim 6, further comprising: a market transaction unit configured to conduct transactions with an electricity market; wherein the preparation unit prepares the operation plan based on adjustment amounts related to demand-and-supply adjustment commands of electric power for the consumer control apparatus, the adjustment amounts being acquired from the market transaction unit.

8. The consumer apparatus operation management system according to claim 6, further comprising: an operation execution unit configured to generate and output control commands directed to the consumer control apparatus.

9. The consumer apparatus operation management system according to claim 7, further comprising:
    an apparatus management unit configured to receive control results of the consumer control apparatus due to the demand-and-supply adjustment commands; and
    a fee calculation unit configured to calculate incentives paid to respective consumers based on the control results transmitted from the apparatus management unit.

10. A consumer apparatus operation management method for preparing an operation plan of a consumer control apparatus in a power distribution system, the method comprising the steps of:
    acquiring system information including a system topology and impedances in the power distribution system;
    predicting load amounts and power generation amounts for respective prescribed nodes;
    generating a voltage distribution profile indicative of a correlation between a power transmission distance and a voltage transition based on the system information, the load amounts, and the power generation amounts, where the voltage distribution profile includes a delivery reference voltage from a substation and node voltage values of the respective nodes;
    determining an evaluation value based on a variation width of the voltage distribution profile and a specified voltage width; and preparing the operation plan based on the evaluation value.

\* \* \* \* \*